J. HOOD.
MEASURING DEVICE.
APPLICATION FILED JULY 20, 1909.

941,253.   Patented Nov. 23, 1909.

Witnesses
Edw. L. Jewell
N. E. Rockwood

Inventor
John Hood
By Grant Burroughs,
Attorney

UNITED STATES PATENT OFFICE.

JOHN HOOD, OF BOSTON, MASSACHUSETTS.

MEASURING DEVICE.

941,253.

Specification of Letters Patent.

Patented Nov. 23, 1909.

Application filed July 20, 1909. Serial No. 508,670.

*To all whom it may concern:*

Be it known that I, JOHN HOOD, a citizen of the United States, and a resident of Boston, in the county of Suffolk and State of Massachusetts, have invented certain new and useful Improvements in Measuring Devices, of which the following is a description.

The invention relates to a measuring device particularly adapted to the use of dentists. In his practice it is often necessary for the dentist to use small definite portions of mercury in the formation of his amalgams. Ordinarily he arrives at the quantity necessary by guesswork, which results in a waste of materials and an improper proportioning of the constituents of the amalgam.

The invention in the present instance has for its object the provision of a device whereby the exact quantity of mercury necessary for the particular operation can be readily measured so that a proper proportioning of the metals of the amalgamation can be obtained and a waste of materials avoided.

The invention consists in the novel device hereinafter described, pointed out in the appended claim, and illustrated in the accompanying drawings.

Figure 1:
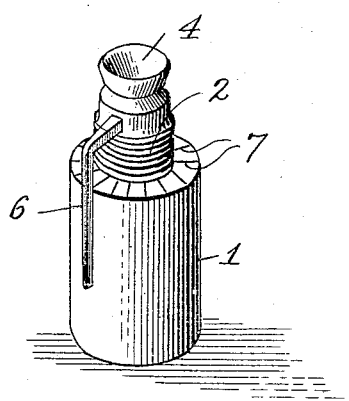
Figure 2:
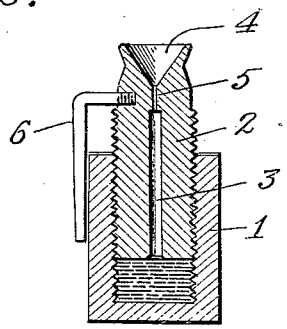

In the drawings, in which similar reference characters designate corresponding parts, Figure 1 is a perspective view of a measuring device embodying the invention. Fig. 2 is a vertical sectional view of the same.

The cylindrical receptacle 1 of hard rubber, or of other suitable material for holding mercury, has a screw-threaded bore that extends the entire length of its interior wall. In this receptacle is the piston 2, also of hard rubber, exteriorly screw-threaded to engage the screw-threaded bore of the receptacle. Extending vertically through the piston is the channel 3 opening at its upper end into the cup 4 on the top of the piston. Just before the channel 3 enters the cup the passage, as at 5, is contracted. Secured in the upper end of the piston is the angular arm 6 forming a pointer extending outside of the receptacle 1 parallel with the vertical axis of the device. As the piston is rotated the pointer registers with the graduations 7 on the upper edge of the receptacle 1.

With the receptacle 1 filled, or partly so, with mercury, when the piston 2 is turned into the same it presses down upon the mercury and forces it through the channel 3 and contracted passage 5 into the cup 4. The contracted passage prevents a too free flow of the mercury through the channel. By calibration the graduations 7 are so spaced that a certain definite weight of mercury will be forced into the cup as the piston is turned so that the pointer travels the distance between two of the graduating marks. For a device of the size shown in the drawings the graduations 7 are spaced so that when the piston is turned to move the pointer from one mark to the next one two grains of mercury will be forced into the cup. By observing the pointer 6 as it passes the marks 7 when the piston is turned down into the receptacle, the desired weight of mercury can be measured into the cup, from which it can be turned into the receptacle where the amalgam is made.

Having thus described my invention, what I claim and desire to secure by Letters Patent is,

In a measuring device, a cylindrical receptacle provided with graduations and having a screw-threaded bore, a piston exteriorly screw-threaded to engage the bore of the receptacle, a cup at the outer end of the piston communicating through the latter with the interior of the receptacle, and a pointer on said piston to register with the graduations on the receptacle as the piston is rotated to force the contents of the receptacle through the communication through the piston into the cup.

In testimony whereof I hereunto affix my signature in the presence of two witnesses.

JOHN HOOD.

Witnesses:
 GEORGIA H. RILEY,
 OTIS ATKINSON.